(12) United States Patent
Shelmon et al.

(10) Patent No.: US 7,344,056 B2
(45) Date of Patent: Mar. 18, 2008

(54) COLLAPSIBLE CONTAINER HOLDER

(75) Inventors: William Shelmon, Lathrup Village, MI (US); Paul St. Angelo, Livonia, MI (US); Hidenori Uno, Nissin (JP)

(73) Assignee: Toyota Motor Engineering & Manufacturing North America, Inc., Ann Arbor, MI (US)

( * ) Notice: Subject to any disclaimer, the term of this patent is extended or adjusted under 35 U.S.C. 154(b) by 149 days.

(21) Appl. No.: 10/658,302

(22) Filed: Sep. 9, 2003

(65) Prior Publication Data

US 2005/0051584 A1     Mar. 10, 2005

(51) Int. Cl.
*B60R 7/04*  (2006.01)

(52) U.S. Cl. ............... 224/549; 224/926; 248/311.2; 220/8

(58) Field of Classification Search ............ 206/505; 135/140, 142; 403/109.1; 224/926, 552, 224/549, 548, 275; 220/4.32, 8
See application file for complete search history.

(56) References Cited

U.S. PATENT DOCUMENTS

| | | | |
|---|---|---|---|
| 879,370 A * | 2/1908 | Dennison | 220/8 |
| 2,893,167 A * | 7/1959 | Davidson | 47/73 |
| 4,534,474 A * | 8/1985 | Ng | 211/70 |
| 4,613,048 A * | 9/1986 | McGill | 224/400 |
| 4,783,037 A | 11/1988 | Flowerday | 248/311.2 |
| 4,784,112 A * | 11/1988 | Hayashi | 126/262 |
| 4,854,468 A | 8/1989 | Dahlquist, II et al. | 220/85 H |
| 4,928,865 A | 5/1990 | Lorence et al. | 224/275 |
| 5,007,610 A | 4/1991 | Christiansen et al. | 248/311 |
| 5,018,633 A * | 5/1991 | Toth et al. | 248/311.2 |
| 5,072,989 A | 12/1991 | Spykerman et al. | 297/194 |
| 5,096,152 A | 3/1992 | Christiansen et al. | 248/311.2 |
| 5,131,716 A | 7/1992 | Kwasnik et al. | 297/194 |
| 5,150,803 A * | 9/1992 | Cartellone | 215/357 |
| 5,174,534 A * | 12/1992 | Mitchell | 248/311.2 |
| 5,259,580 A | 11/1993 | Anderson et al. | 248/311.2 |
| 5,284,314 A | 2/1994 | Misaras et al. | 248/311.2 |
| 5,379,978 A | 1/1995 | Patel et al. | 248/311.2 |
| 5,423,568 A * | 6/1995 | Zushi et al. | 280/728.2 |
| 5,489,054 A | 2/1996 | Schiff | 224/281 |
| 5,490,653 A * | 2/1996 | Ingwersen | 248/311.2 |
| 5,494,249 A | 2/1996 | Ozark et al. | 248/311.2 |
| 5,511,853 A | 4/1996 | Wallis | 297/364 |
| 5,524,958 A | 6/1996 | Wieczorek et al. | 297/188.17 |

(Continued)

FOREIGN PATENT DOCUMENTS

DE       10101642 A1 *  7/2002

(Continued)

*Primary Examiner*—Nathan J. Newhouse
*Assistant Examiner*—Justin M. Larson
(74) *Attorney, Agent, or Firm*—Gifford, Krass, Sprinkle, Anderson & Citkowski, P.C.

(57) ABSTRACT

The present invention provides a collapsible container holder assembly for a vehicle having a floor tray. The container holder assembly comprises a carrier portion adapted to be selectably fastened to the floor tray of the vehicle and includes at least one recessed opening formed therein for receiving a beverage container. At least one container receptor portion is adapted to be telescopically engaged and retained within the at least one opening formed in the carrier portion wherein the at least one container receptor portion is adjustable between an extended and collapsed position relative to the carrier portion as desired by the user.

4 Claims, 5 Drawing Sheets

U.S. PATENT DOCUMENTS

| | | | |
|---|---|---|---|
| 5,527,008 A | 6/1996 | Schutter et al. | 248/311.2 |
| 5,651,523 A | 7/1997 | Bridges | 248/311.2 |
| 5,680,974 A | 10/1997 | Vander Sluis | 224/281 |
| 5,702,041 A | 12/1997 | Sun et al. | 224/539 |
| 5,704,579 A | 1/1998 | Celentino et al. | 248/311.2 |
| 5,720,516 A * | 2/1998 | Young | 297/188.18 |
| 5,746,363 A | 5/1998 | Teller et al. | 224/547 |
| 5,749,554 A | 5/1998 | Avila et al. | 248/311.2 |
| 5,762,307 A | 6/1998 | Patmore | 248/311.2 |
| 5,782,448 A * | 7/1998 | Withun et al. | 248/311.2 |
| 5,788,324 A | 8/1998 | Shea et al. | 297/113 |
| 5,791,617 A | 8/1998 | Boman et al. | 248/311.2 |
| 5,791,618 A * | 8/1998 | Lancaster | 248/311.2 |
| 5,800,011 A | 9/1998 | Spykerman | 297/188 |
| 5,848,820 A | 12/1998 | Hecht et al. | 297/188 |
| 5,857,633 A | 1/1999 | Pelchat, II et al. | 248/311.2 |
| 5,878,986 A | 3/1999 | Sun et al. | 248/311.2 |
| D413,563 S | 9/1999 | Gravenstreter | D12/419 |
| 5,988,579 A | 11/1999 | Moner, Jr. et al. | 248/311.2 |
| 5,988,917 A * | 11/1999 | Sheffler et al. | 401/78 |
| 6,045,173 A | 4/2000 | Tiesler et al. | 296/37.8 |
| 6,050,468 A * | 4/2000 | Kelley | 224/542 |
| 6,059,244 A | 5/2000 | Bilandzic et al. | 248/311.2 |
| 6,062,518 A | 5/2000 | Etue | 248/231.21 |
| 6,065,729 A | 5/2000 | Anderson | 248/311.2 |
| 6,123,307 A | 9/2000 | Bain | 248/311.2 |
| 6,145,474 A * | 11/2000 | Lemkin | 119/61.5 |
| 6,170,787 B1 * | 1/2001 | Morgan | 248/311.2 |
| 6,189,851 B1 | 2/2001 | Ozark et al. | 248/311.2 |
| 6,206,260 B1 | 3/2001 | Covell et al. | 224/539 |
| 6,361,008 B1 | 3/2002 | Gravenstreter | 248/311.2 |
| 6,419,379 B1 | 7/2002 | Hulse | 362/488 |
| 6,435,587 B1 * | 8/2002 | Flowerday et al. | 296/37.8 |
| 6,779,769 B1 * | 8/2004 | York et al. | 248/311.2 |
| 6,834,838 B2 * | 12/2004 | Dennis et al. | 248/311.2 |

FOREIGN PATENT DOCUMENTS

| | | |
|---|---|---|
| DE | 10159146 A1 * | 6/2003 |
| JP | 2001-287584 | 10/2001 |
| JP | 2002-316572 | 10/2002 |
| JP | 2002362212 A * | 12/2002 |
| JP | 2003048472 A * | 2/2003 |
| JP | 2004074904 A * | 3/2004 |

\* cited by examiner

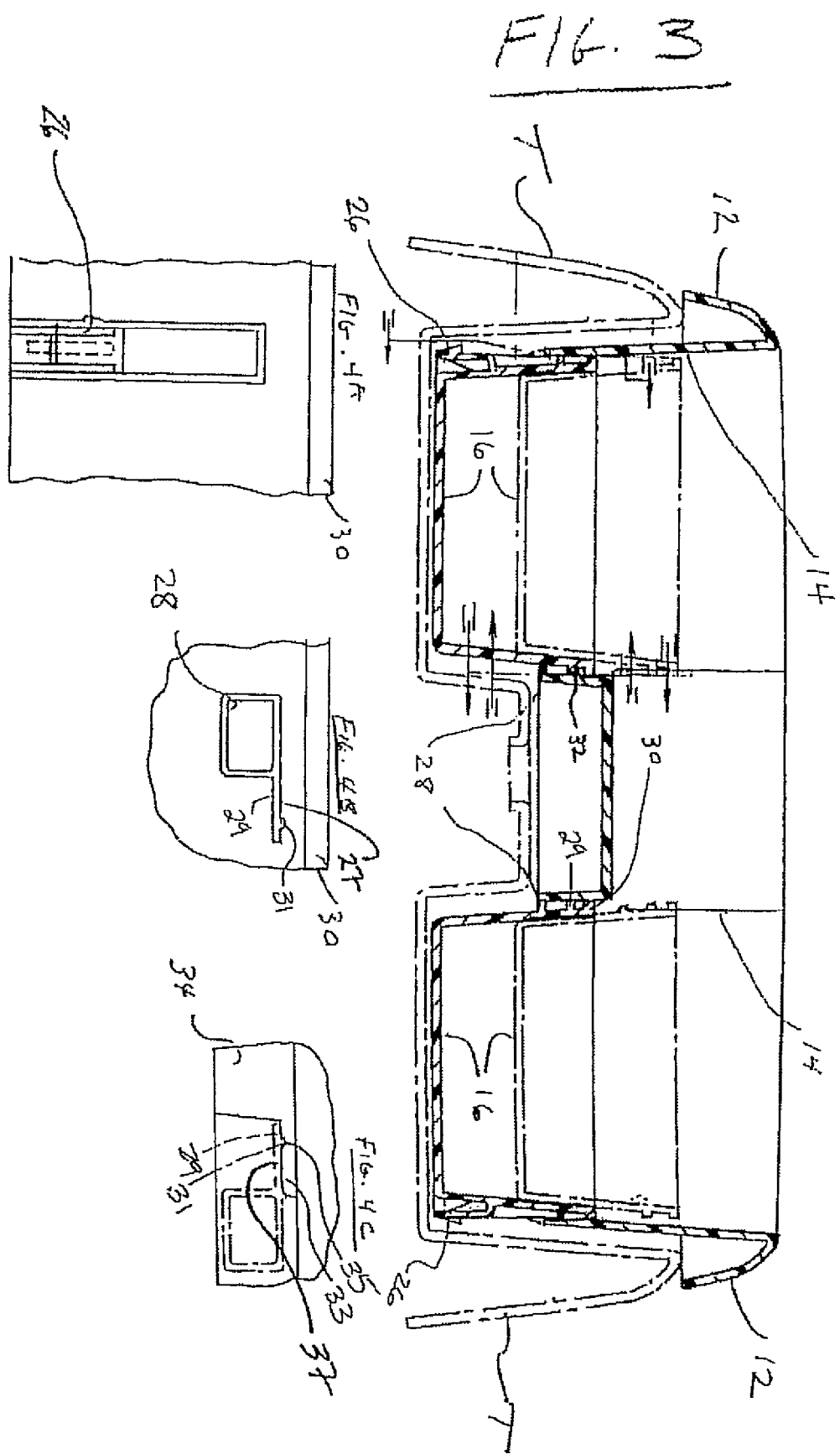

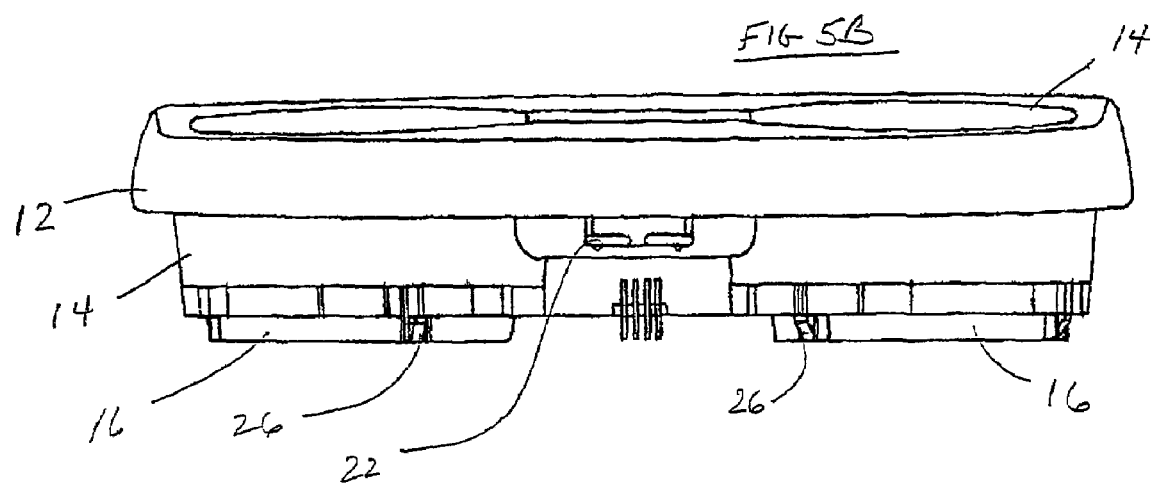

US 7,344,056 B2

COLLAPSIBLE CONTAINER HOLDER

FIELD OF THE INVENTION

The present invention relates to container holders for vehicles and, more particularly, to a collapsible container holder operative to be selectably installed in a vehicle and capable of being stored in a plurality of locations inside the vehicle when disposed in the collapsed position.

BACKGROUND OF THE INVENTION

It is a well known fact that a driver or passenger in an automobile is somewhat restricted in movement and in some cases has little or no place to temporarily hold his or her beverage container. Many commercially available auto beverage holders are said to be unsatisfactory as far as the designs for adjustability, stability and more importantly storageability when not in use.

U.S. Pat. No. 4,828,211 to McConnell discloses a holder for beverage containers and the like for steadily, but removably and replaceably, supporting such a beverage container in a vehicle so as to prevent spilling of the contents of the beverage container when the vehicle is moving. The holder is foldable into a relatively compact boxlike configuration so as to protrude minimally from the supporting surface of the vehicle when not in use. It is appreciated that the holder is functionally and commercially advantageous with respect to storageability in view of many commercially available holders which lack the ability to be compacted for storage in the vehicle thus limiting the number of convenient and/or available spaces for such storage. However, the holder of the '211 reference requires a complex design to facilitate the disclosed folding characteristic and is operative to be attached to an upstanding supporting surface for use in a vehicle.

The present invention overcomes these disadvantages by providing a selectably attachable container holder for a vehicle wherein the holder includes a collapsible feature that facilitates storage in a plurality of convenient locations within the interior of the vehicle when not in use.

SUMMARY OF THE INVENTION

The present invention provides a collapsible container holder assembly for use in a vehicle. The container holder assembly includes a support or carrier portion adapted to be selectably disposed in the vehicle as desired when needed to support a beverage container of the user. The carrier portion includes at least one retaining member for securing the holder assembly to the floor tray in a stable manner at all times during vehicle mobility. The carrier portion also includes at least one recessed opening formed therein wherein the openings are dimensioned to receive beverage containers of various sizes therein and operative to support a portion of the beverage container to inhibit tilting or swaying during driving.

At least one container receptor portion is provided and is adapted to be telescopically engaged and retained within the at least one opening formed in the carrier portion. Once assembled together with the carrier portion, the at least one container receptor portion is selectably adjustable between extended and collapsed positions relative to the carrier portion.

For use, the container holder assembly is preferably disposed on the floor tray of the vehicle after the at least one container receptor portion is adjusted to the extended position relative to the carrier portion. When not in use, the container holder assembly is adjusted to the collapsed position relative to the carrier portion such that the container holder assembly may be compactly and conveniently stored in a number of locations within the vehicle interior.

BRIEF DESCRIPTION OF THE DRAWINGS

A better understanding of the present invention will be had upon reference to the following detailed description when read in conjunction with the accompanying drawings in which like parts are given like reference numerals and wherein:

FIG. 3 illustrates a front cutaway view of the container holder assembly in an extended position and phantom line collapsed position;

FIG. 4A illustrates a two-dimensional view of a retaining arm disposed on an exterior surface of a container receptor portion as according to the invention;

FIG. 4B illustrates a first portion of a locking mechanism disposed on an exterior surface of the container receptor portion as according to the invention;

FIG. 4C illustrates a complementary portion of the locking mechanism of FIG. 4B disposed on the carrier portion of the container holder assembly as according to the invention;

FIG. 5B illustrates a perspective front view of the container holder assembly in a collapsed position to facilitate storage as according to the invention;

DETAILED DESCRIPTION OF THE INVENTION

Concealable container holders for vehicles are particularly useful in motor vehicles where space conservation and aesthetics are prime concerns. When not in use, a storageable container holder can be stashed away in a glove box compartment, under a passenger seat, or in a door panel, thereby freeing the space occupied by the container holder and removing it from the sight of the drivers and passengers. The present invention provides a selectably attachable container holder assembly preferably for use in a floor tray of a vehicle wherein the container holder assembly is compactly adjustable to enhance its storageability in a plurality of convenient locations within the vehicle. Although a preferred embodiment of the container holder assembly is selectably attachable to a vehicle floor tray, it is appreciated that the inventive holder may be adapted to selectably attach at various locations within a vehicle interior without exceeding the scope of the invention.

Figure 1:
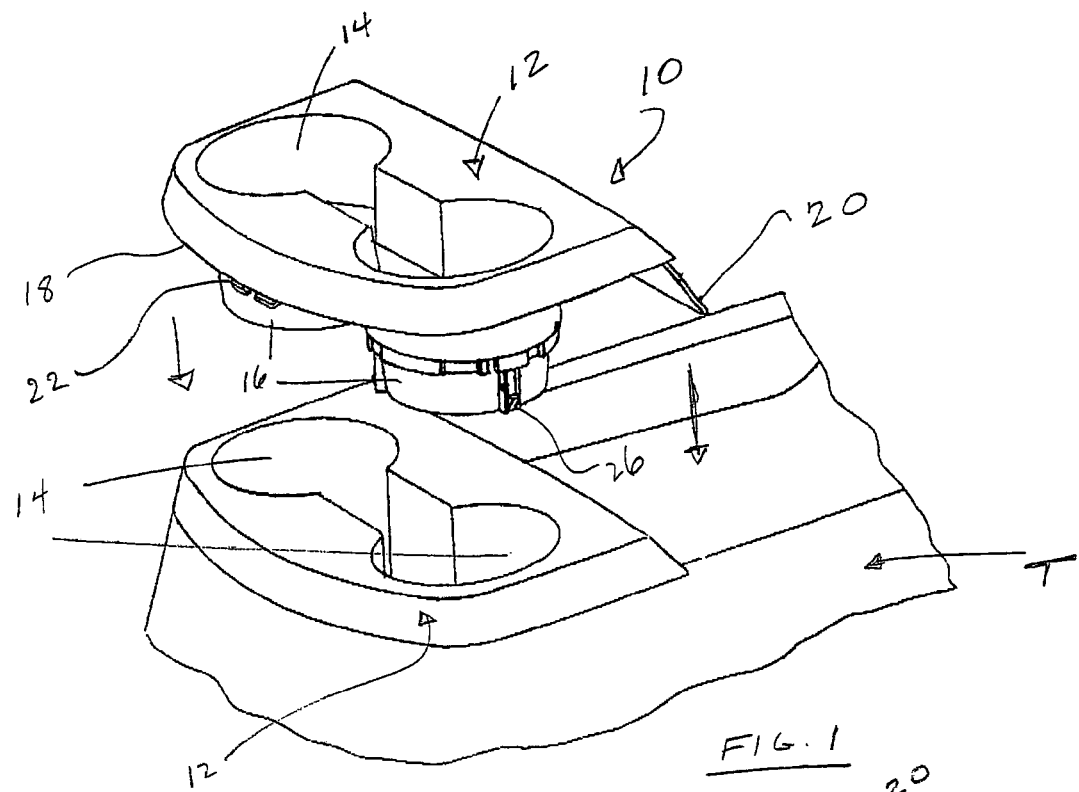
FIG. 1 is a perspective view of the inventive container holder assembly before and after installation into a floor tray of a vehicle.

With reference to FIG. 1, the inventive container holder assembly 10 is illustrated before and after being seated within a floor tray T of a vehicle. The inventive container holder assembly 10 includes a carrier portion 12 having at least one recessed opening 14 formed therein. Preferably, the carrier portion 12 is formed to seat in the floor tray T in a structurally and aesthetically pleasing manner such that the container holder assembly 10 complements the dimensions of the floor tray T.

It is appreciated that the size of the recessed openings 14 formed in the carrier portion 12 are dimensioned to receive a plurality of beverage containers of different sizes therein whereby the beverage container will be supported by the recessed opening 14 in a manner that minimizes tipping or tilting of the beverage container during mobility of the vehicle. The recessed openings 14 may be provided is a plurality of cylindrical shapes which illustratively include circular, polygonal, oval and/or elliptical.

The carrier portion 12 includes front 18 and rear 20 sides wherein at least the front side 18 is preferably formed to the contour of the floor tray to enhance its aesthetic appearance when disposed therein. A preferred embodiment of the carrier portion 12 includes two recessed cylindrical openings 14 such that at least one beverage container for the driver and passenger of a vehicle may be supported in the container holder assembly 10. However, it is appreciated that container holder assembly 10 may be provided with one or more cylindrical openings without departing from the scope of the invention.

Still referring to FIG. 1, at least one container receptor portion 16 is adapted to telescopically engage and be retained within the at least one opening 14 formed in the carrier portion 12. In this manner, the at least one container receptor portion 16 can be adjusted along an axis of movement between an extended and collapsed position relative to the carrier portion 12 as desired by the user. Once the at least one container receptor portion 16 is assembled into the carrier portion 12, the container portion 16 may be adjusted to the extended position by pushing downward on the base of the container receptor portion 16 after placing the hand through the at least one opening 14 formed in the carrier portion 12.

Figure 2:
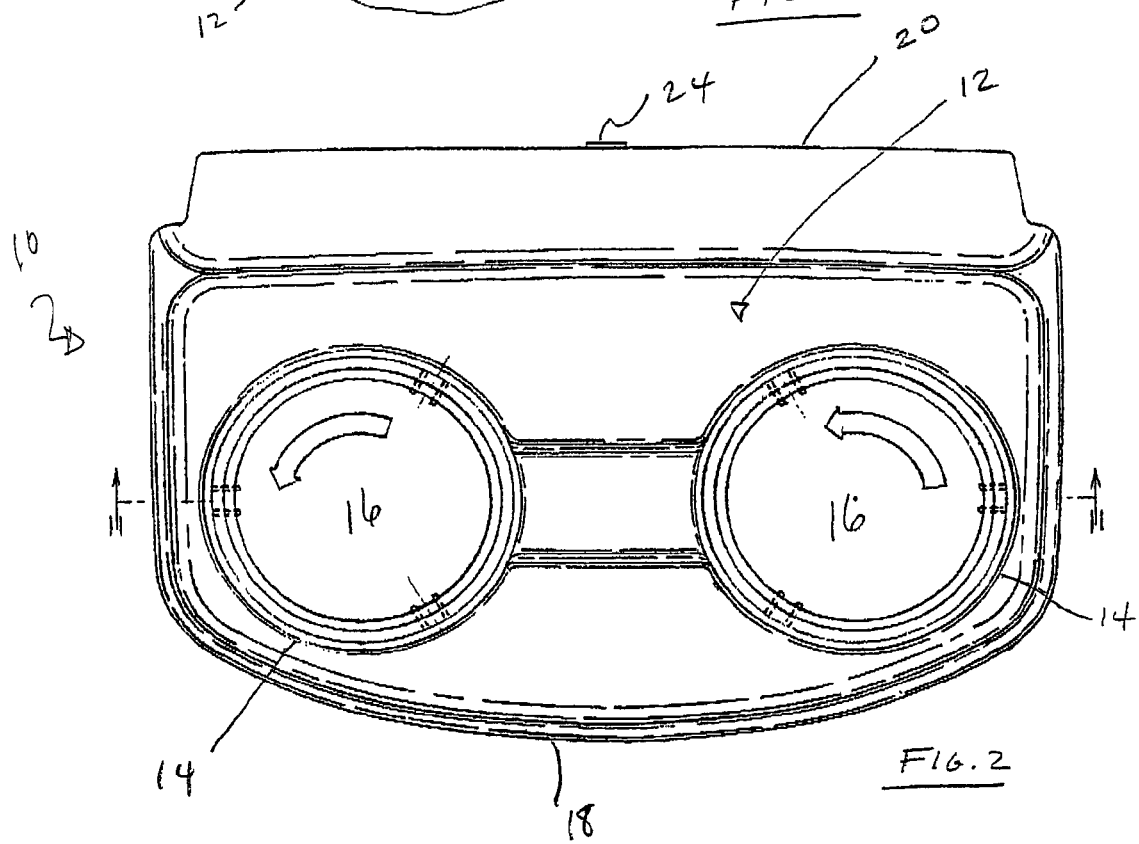
FIG. 2 is an overhead view of the container holder assembly.

FIG. 2 illustrates a top view of a preferred embodiment of the container holder assembly 10 having two container receptor portions 16 disposed in two recessed cylindrical openings 14 formed in the carrier portion 12. At the base of each container receptor portion 16 there is illustrated an arrow pointed in a counterclockwise direction. Once the container portions 16 have been adjusted to the extended position, the container portions 16 may be locked in the extended position by turning the container portions 16 about its axis of movement in the counterclockwise direction of the arrow. This action causes a locking mechanism formed on the container holder assembly 10 to engage. Accordingly, turning the container portion 16 in a clockwise direction would cause the release of the container portion 16 from the locked position. The locking mechanism will be described hereinafter.

With reference now to FIG. 3, a front cutaway view of the container holder assembly 10 is illustrated wherein the container portions 16 are illustrated in solid line as being in an extended position and in a collapsed position in phantom line within the cylindrical recessed openings 14 of the carrier portion 12. Preferably, the container receptor portion 16 includes at least one retaining arm 26 disposed on an exterior surface thereof. The at least one retaining arm 26 is operative to prevent the container receptor portion 16 from being pushed out from the carrier portion 12 when the container receptor portion 16 is moved to the collapsed position. FIG. 4A illustrates a front view of the at least one retaining arm 26 as it is formed on the exterior surface of the container receptor portion 16. As best shown in FIG. 5B, the retaining arm 26 operates as a stop against a peripheral edge of the recessed opening 16 to prevent the container portion 16 from being pushed therethrough when moved to the collapsed position. Preferably, the retaining arm 26 is resiliently biased such that it maintains positive contact with the surface of the opening 14 when in the collapsed position.

Figure 5A:
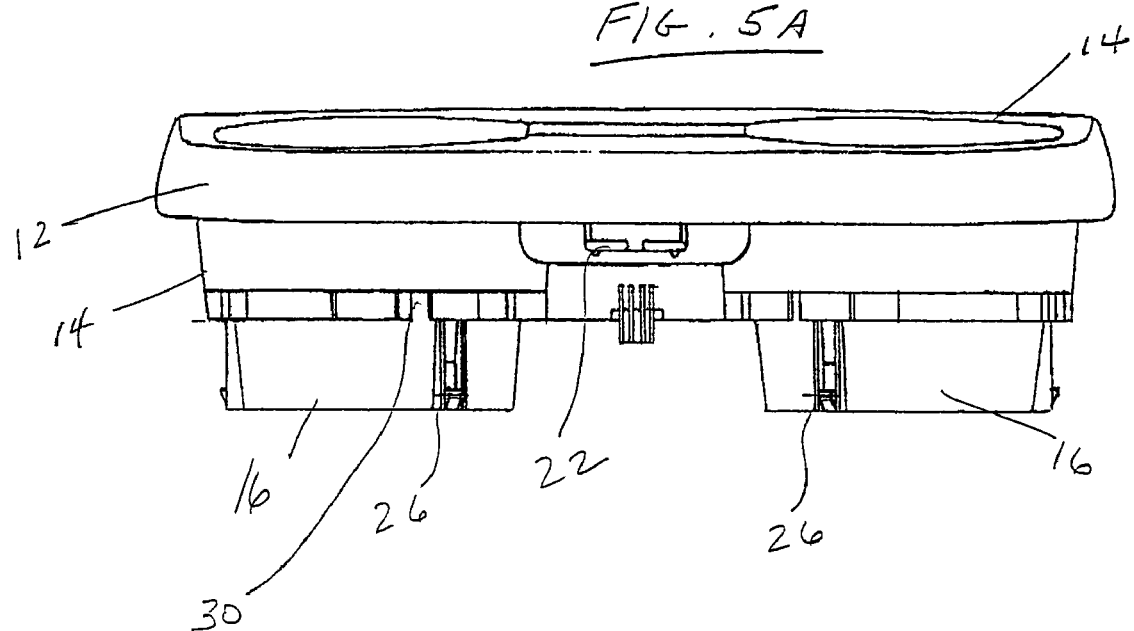
FIG. 5A illustrates a perspective front view of the container holder assembly in an extended position as according to the invention.

FIGS. 3 and 5A further illustrate the container holder assembly 10 in an extended position. Each of the container receptor portions 16 includes a flanged rim 30 which contacts support edges 32 disposed on a portion of an interior surface of the recessed opening 14. The support edges 32 operate to support a container receptor portion 16 within the recessed opening 14 when the container receptor portions 16 are moved to the extended position.

With reference now to FIGS. 4B and 4C, the locking mechanism includes a first portion 28 protruding outwardly from an exterior surface of the container receptor portion 16 adjacent the flanged rim 30. The locking mechanism also includes second portion 34 disposed on an interior surface of the recessed cylindrical openings 14 of the carrier portion 12. The first 28 and second 34 portions are locking engageable to retain the container receptor portion 16 in the extended position. More specifically, the first portion 28 includes a wall or arm 29 that extends outwardly from the exterior surface of the container receptor portion 16. The arm 29 extends longitudinally along a plane generally orthogonal to the axis of movement of the container portion 16. A bump or boss 31 extends outwardly from a top surface 27 of the arm 29. The second portion 34 of the locking mechanism includes a flange 33 having a bottom surface 37 complementary with the top surface of the arm 29. The bottom surface 37 of the flange 33 also includes a recess 35 for receiving the boss 31. The top 27 and bottom 37 surfaces engage or contact each other during the aforementioned counterclockwise rotation of the container receptor portion 16 relative to the carrier portion 12 to lock the container receptor portion 16 in the extended position. Further, the engagement between the boss 31 and the recess 35 resists accidental clockwise rotation or unlocking of the container receptor portion 16 relative to the carrier portion 12. FIG. 4C illustrates the complementary engagement between the first portion 28 and the complementary second portion 34 after the container receptor portion 16 has been rotated in a counterclockwise direction while in the extended position as described above.

FIG. 5A is a solid line perspective view of the container holder assembly 10 in the extended position wherein at least one retaining member 22 is formed on the front side 18 of the carrier portion 12. With reference again to FIG. 2, an additional retaining member 24 is provided on the rear side 20 of the carrier portion. As according to a preferred embodiment of the container holder assembly 10, the retaining members 22 and 24 are adapted to engage at least one complementary retaining point at the floor tray such that the container holder assembly 10 is selectably fastened to the floor tray to enhance stability during mobility of the vehicle.

Figure 6:
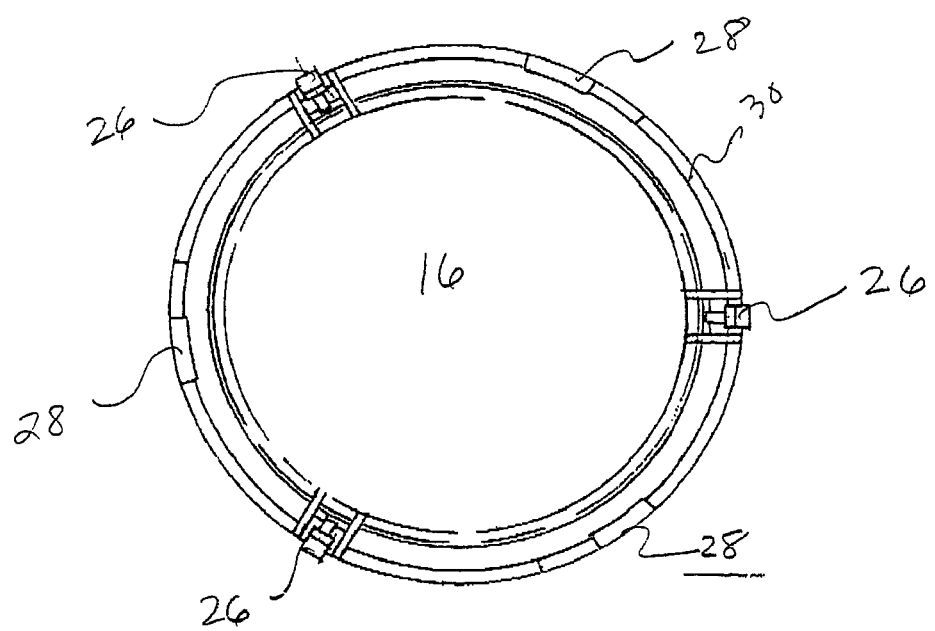
FIG. 6 illustrates a bottom view of the container receptor portion of the container holder assembly as according to the invention.

FIG. 6 illustrates a bottom view of a container receptor portion 16 wherein retaining arms 26 and the first portion 28 of the locking mechanism are disposed on an exterior surface thereof.

Preferably, the components of the collapsible container holder assembly 10 are formed from an injection molding process using an appropriate injection moldable material as known to those skilled in the art. However, it is appreciated that the inventive container holder assembly 10 may be formed by other methods and made of other materials suitable for such purpose.

Figure 7:
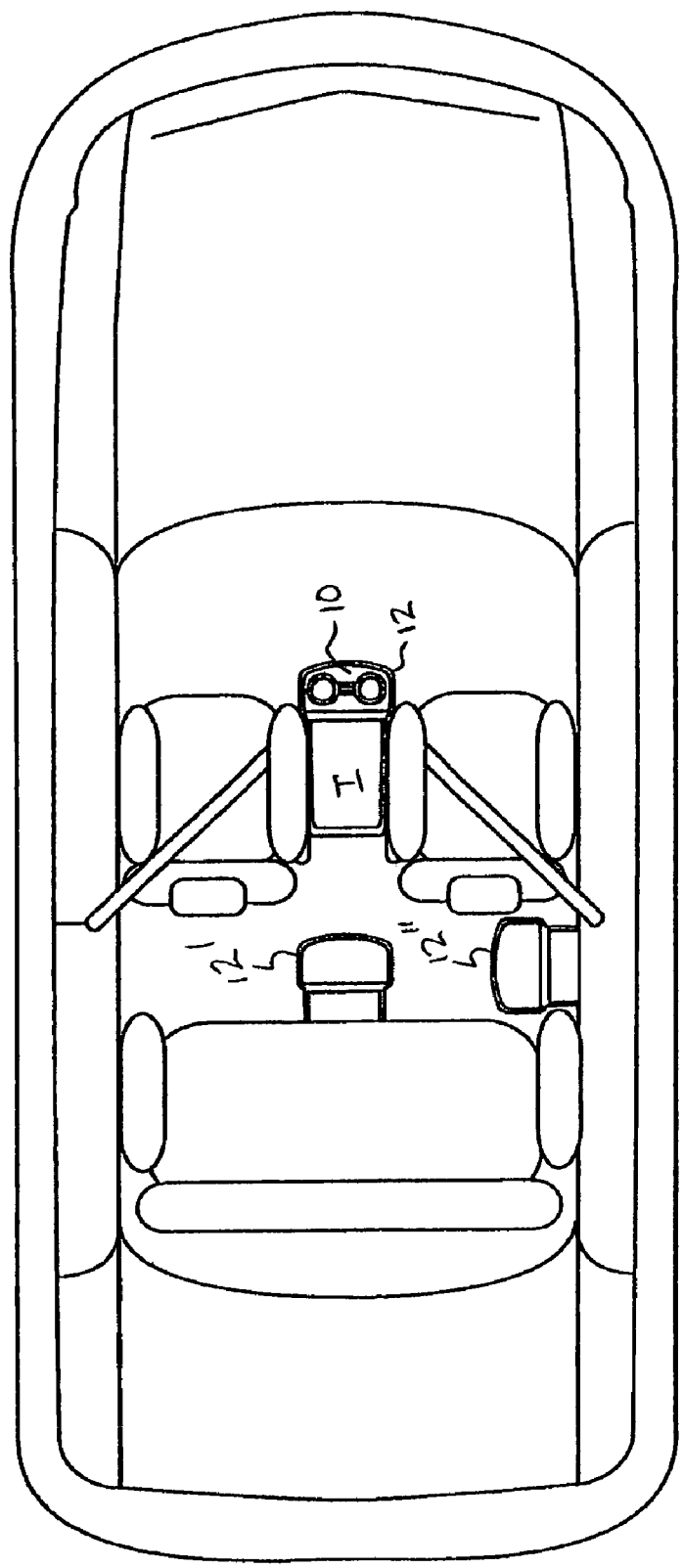
FIG. 7 is a top elevational view of a vehicle incorporating the container holder according to the invention.

The foregoing figures and descriptions are provided as illustrative of a preferred embodiment of the inventive collapsible container holder assembly 10 for use in a vehicle having a floor tray. However, it is appreciated that other embodiments may be structured to be selectably attachable to other locations within a vehicle other than the floor tray, as illustrated at 12' and 12" in FIG. 7. It is understood that various changes to the central components and conditions of the apparatus may be resorted to without departing from the spirit of the invention or the scope of the claims as presented.

We claim:

1. A collapsible container holder assembly for carrying a container in a vehicle, said container holder comprising: a carrier portion having at least one recessed opening extending between a top end and an opposite bottom end of said carrier portion; at least one container receptor portion having a generally horizontal and planar support surface integral with and forming a closed bottom end of the container receptor portion for supporting a bottom end of the container, said container receptor portion being adjustable relative to said carrier portion between a collapsed position disposed within said recessed portion and an extended position protruding axially and downwardly relative to said bottom end of said carrier portion, wherein said container receptor portion comprises at least one retaining arm disposed on an exterior surface thereof, said at least one retaining arm hookingly engaging a peripheral edge of the carrier portion to prevent said at least one container receptor portion from being pushed out from said carrier portion when said at least one container receptor portion is moved to said collapsed position; and a locking mechanism for locking said at least one container receptor portion in said extended position, said locking mechanism being locked by rotating said at least one container receptor portion in a first direction while extended and unlocked by rotating the at least one container receptor portion in an opposite second direction, said locking mechanism comprising: an arm protruding from an exterior surface of said container receptor portion toward said carrier portion, said arm being spaced apart from and generally parallel with a radially outwardly extending rim of said container receptor portion; and a flange protruding from an interior surface of said carrier potion toward said container receptor portion, said flange being aligned in the axial direction between said arm and said rim when said container receptor portion is in said extended position, said flange being retained between said arm and said rim after said rotation of said at least one container receptor portion in said first direction to lock said at least one container receptor portion in said extended position, said arm having a boss that extends generally axially toward said rim of said container receptor portion, said flange having a recess that is complementary with said boss and receives said boss therein to resist rotation of said at least one container receptor portion relative to said carrier portion.

2. A collapsible container holder assembly as set forth in claim 1, wherein said flange is generally parallel with said arm.

3. A collapsible container holder assembly as set forth in claim 2, wherein said arm has a boss that extends generally axially toward said rim of said container receptor portion.

4. A collapsible container assembly as set forth in claim 3, wherein said flange has a recess that is complementary with said boss and receives said boss therein to resist rotation of said at least one container receptor portion relative to said carrier portion.

* * * * *

UNITED STATES PATENT AND TRADEMARK OFFICE
CERTIFICATE OF CORRECTION

PATENT NO. : 7,344,056 B2 Page 1 of 1
APPLICATION NO. : 10/658302
DATED : March 18, 2008
INVENTOR(S) : William Shelmon et al.

It is certified that error appears in the above-identified patent and that said Letters Patent is hereby corrected as shown below:

Column 6, line 9, replace "potion" with --portion--

Signed and Sealed this

Seventeenth Day of June, 2008

JON W. DUDAS
*Director of the United States Patent and Trademark Office*